W. C. GRIFFIN.
FRUIT DRYING MACHINE.
APPLICATION FILED MAY 14, 1912.
1,118,547.
Patented Nov. 24, 1914.
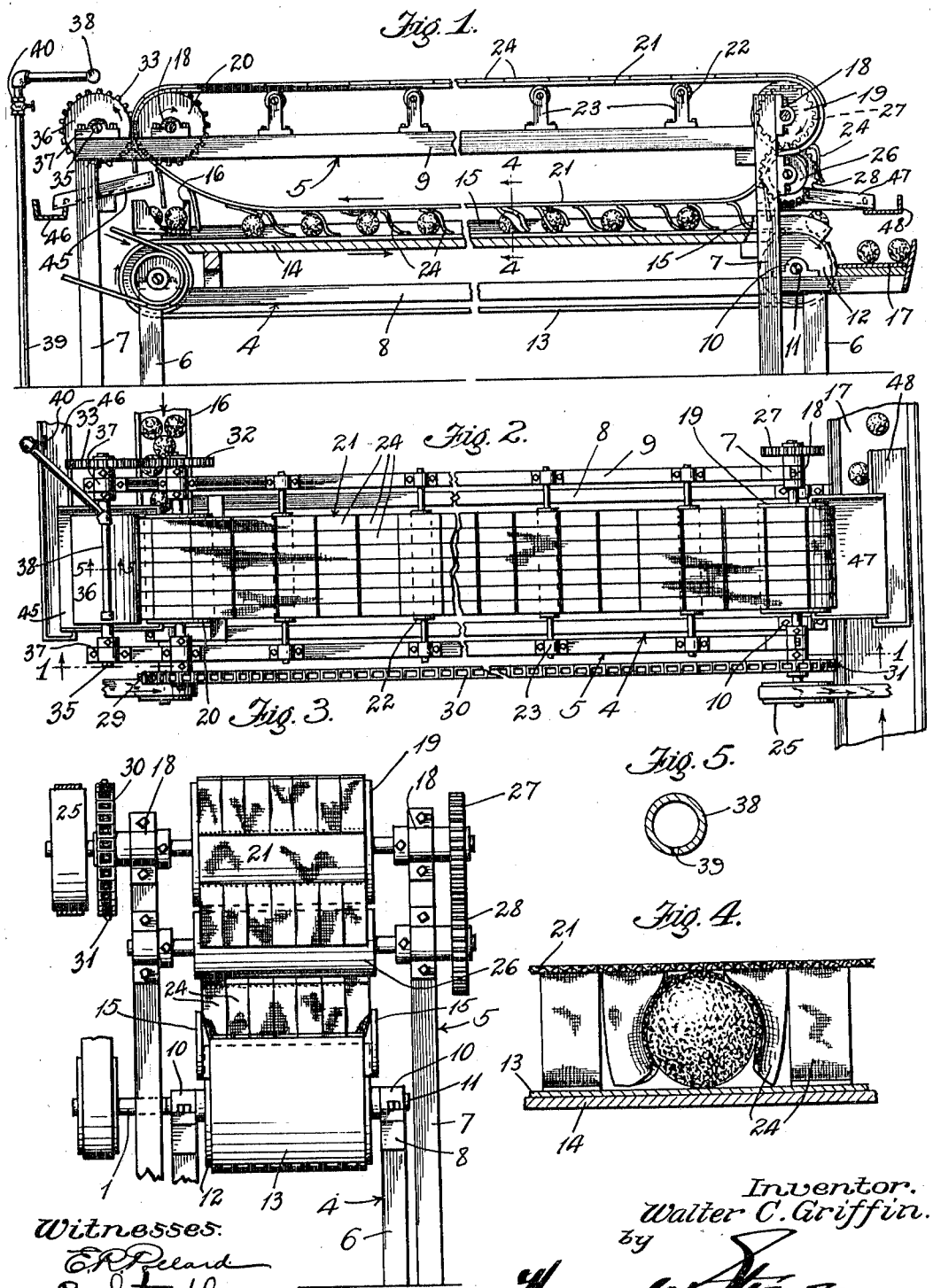
Inventor.
Walter C. Griffin.

UNITED STATES PATENT OFFICE.

WALTER C. GRIFFIN, OF CLAREMONT, CALIFORNIA, ASSIGNOR TO GEORGE D. PARKER, OF RIVERSIDE, CALIFORNIA.

FRUIT-DRYING MACHINE.

1,118,547.  Specification of Letters Patent.  Patented Nov. 24, 1914.

Application filed May 14, 1912. Serial No. 697,118.

*To all whom it may concern:*

Be it known that I, WALTER C. GRIFFIN, a citizen of the United States, residing at Claremont, in the county of Los Angeles and State of California, have invented a new and useful Fruit-Drying Machine, of which the following is a specification.

This invention relates more specifically to an apparatus for drying various fruits that have been passed through washing apparatus, and an object thereof is to provide an apparatus that will thoroughly dry all kinds of fruit, and more particularly citrus fruits, after a washing operation, and to polish the same whereby the fruit is rendered marketable.

I accomplish this object by means of the apparatus described herein and illustrated in the accompanying drawing in which, Figure 1 is a side elevation of my improved drier. Fig. 2 is a plan view of the same. Fig. 3 is an elevation of one end of the drier. Fig. 4 is a transverse section through the conveyers taken on line 4—4 of Fig. 1. Fig. 5 is an enlarged detail section of the spraying pipe.

Heretofore it has been the custom in preparing fruits for the market and more especially citrus fruits, to thoroughly wash the same so as to remove all the dust and dirt which may adhere to the exterior of the fruit. After thoroughly cleansing the fruit in various special apparatus provided for that purpose, they have passed the moist fruit through a drying apparatus, and dried the same by means of air blasts. This method of drying the fruit has been found to be not only costly as far as the operation of the blower is concerned, but for the additional reason that the blower system does not thoroughly accomplish the operation of drying fruit.

By means of my apparatus the fruit is thoroughly dried and at the same time it is given a polish, thereby increasing its salable qualities.

Referring more specifically to the drawings, the preferred form of my apparatus consists of a lower and upper frame 4 and 5 respectively, each frame consisting of uprights 6 and 7 and horizontally disposed bars 8 and 9, which bind each of the two frames rigidly together.

Mounted at the ends of frame 4 in bearings 10 are shafts 11 on which are mounted conveyer drums 12, which drums may be solid or of a built up construction.

Rotatably mounted on drums 12 is an endless fruit conveyer belt 13, preferably formed of canvas or similar material. This belt passes over a supporting table 14 rigidly secured to the horizontal bars 8 of frame 4 in any well known manner. The supporting table 14 is for the purpose of forming a support for the fruit which is passing along the conveyer. The supporting table 14 is also provided along the longitudinal edges thereof on either side of the conveyer belt, with vertically extending flanges 15 to prevent the fruit from rolling off the conveyer during its passage therethrough.

Mounted on one end of frame 5 is an inlet chute 16 which projects transversely across the end of the conveyer belt as best shown in Fig. 1 of the drawing, which delivers the fruit from the washing machine onto the conveyer belt. The opposite end of the frame 4 is provided with a fruit runway 17 transversely disposed, which is adapted to carry the fruit to any desired point for shipment.

Mounted in the ends of frame 5 and rotatably secured in bearings 18 are conveyer drums 19 and 20 on which is loosely mounted a belt 21, the upper portion of the belt being supported by rollers 22 mounted in bearings 23 which are secured to the horizontally disposed bars 9 of the frame 5. Transversely mounted on the outer face of belt 21 is a plurality of tabs 24 preferably formed from an absorbent material such as Turkish toweling, the tabs 24 hanging downwardly as the conveyer belt passes over the fruit conveyer belt 13, and as best shown in Figs. 1 and 4 of the drawings. Rigidly mounted on the shafts of one of the drums 19 is a pulley 25, belted to a source of power not shown. Mounted on frame 6 at one end thereof and adjacent to the drum on which the driving pulley 25 is mounted and directly below the said drum 19, is a drum 26 which in conjunction with the drum 19 forms a wringer device for extracting the moisture from the tabs 24. The shaft of drum 19 is provided with a gear 27 which meshes with a gear 28 mounted on drum 26 for the purpose of imparting motion thereto.

The shaft of drum 20 which is mounted on frame 5 is provided with a sprocket wheel 29, a sprocket chain 30 being mounted thereon and passing over the sprocket 31 mounted on the shaft of drum 19, whereby motion is imparted to the drum 20.

Mounted on the shaft of drum 20 and opposite the end on which the sprocket wheel 29 is secured is a gear 32 which meshes with a gear 33 mounted on the shaft 35 on which is mounted a drum 36, the said shaft 35 being mounted in bearings 37 secured to the frame 6 of the machine. Transversely disposed over drum 36 is a water distributing pipe 38 provided with perforations or outlets 39 in the lower portion thereof as clearly illustrated in Fig. 5 of the drawings. This pipe is connected with a source of water supply 39 which is controlled by a valve 40. The purpose of the above described construction is to provide a continuous spray of water for cleansing the tabs 24 attached to the belt 21, after they have once passed over the wet fruit thereby thoroughly drying said fruit.

The shafts of drums 20 and 35 being disposed in parallel relation to each other and also adjacent to each other, will press the tabs 24 and extract any moisture therefrom before subjecting them to the cleansing action of the spray.

Transversely disposed between vertical uprights 7 of frame 9, is an inclined water receptacle 45, emptying the surplus water in chute 46. The opposite end of the machine is provided with a similar apparatus which consists of a receptacle 47 emptying into a water conveying chute 48.

It will be noted from the foregoing that as the fruit conveyer belt 13 rotates in the direction indicated by the arrows thereon and the fruit drying belt rotates in the opposite direction as clearly indicated by the arrows, that the tabs will be brought into an intimate relation with the fruit and thoroughly dry the same on their passage along the conveyer 13. As both the fruit conveyer 13 and the fruit drying belt are each belted to a suitable source of independent power, the same may be driven at various speeds, thus if it is found desirable the fruit may be passed along the fruit conveyer at approximately one half the speed of the fruit drying belt, thus enabling the tabs 24 to contact more than once with the fruit during the passage of the same along the conveyer. As the fruit runs onto the conveyer from the inlet chute 16, and as soon as it begins to contact with the tabs 24 it will be given a rotary motion so that all parts of the fruit will be presented for contact with the tabs, as clearly illustrated in Fig. 4 of the drawing.

From the foregoing description, it will be noted that I have provided a simple apparatus which will efficiently dry fruits after a washing process and will polish the same, which will give them a more attractive appearance for the market.

What I claim is:

1. In a fruit drier, in combination with a conveyer mechanism, of an endless belt mounted over said conveyer, and a plurality of parallel rows of flexible absorbent tabs secured on said belt, said tabs adapted to engage moist fruit passing over said conveyer to dry the same.

2. In a fruit drier, in combination with a conveyer of an endless belt revolubly mounted over said conveyer and adapted to move in a path opposite to the path of said conveyer, and a plurality of flexible tabs of absorbent toweling mounted in parallel transverse rows upon the lower surface of said belt, whereby moist fruit carried on said conveyer is engaged by the edges and surfaces of the tabs forming the parallel rows, and the moisture absorbed.

3. In fruit drying apparatus, the combination of a casing, a device for conveying fruit through the casing, a second device including flexible absorbent material arranged in proximity to the first device and adapted to dry the fruit, and means for imparting motion to the second device.

4. In fruit drying apparatus, the combination of a casing, a device for conveying fruit through the casing, a drying device arranged in the casing in proximity to the first device and consisting of flexible material arranged to have a portion thereof contact with the fruit on the first device, and means for imparting motion to the drying device.

In witness that I claim the foregoing I have hereunto subscribed my name this fourth day of May 1912.

WALTER C. GRIFFIN.

Witnesses:
  C. D. GRAHAM,
  H. E. MEAD.